J. B. SCHAAF.
CURTAIN WINDOW LIGHT.
APPLICATION FILED JULY 9, 1920.
1,423,685.
Patented July 25, 1922.
Fig. 1.
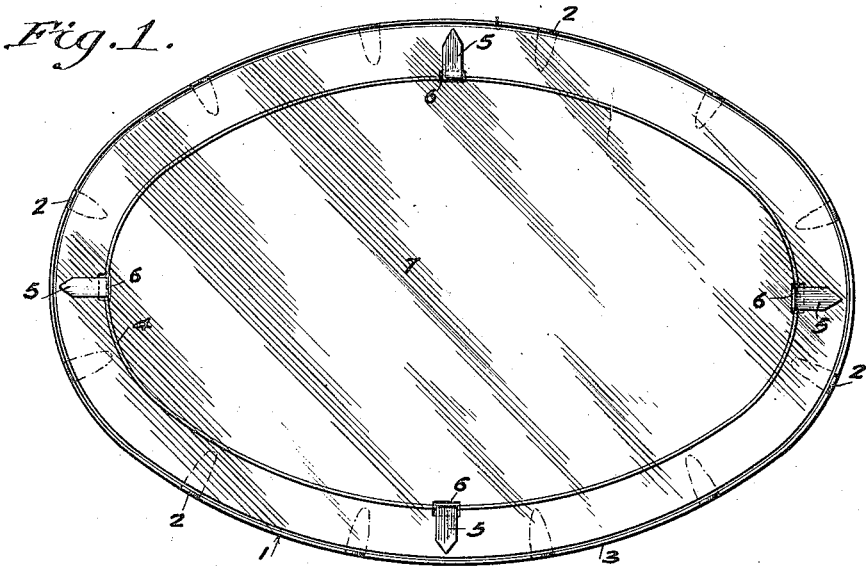
Fig. 2.
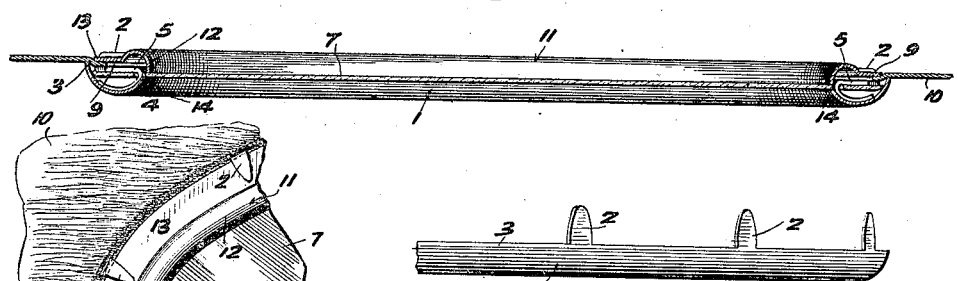
Fig. 3.
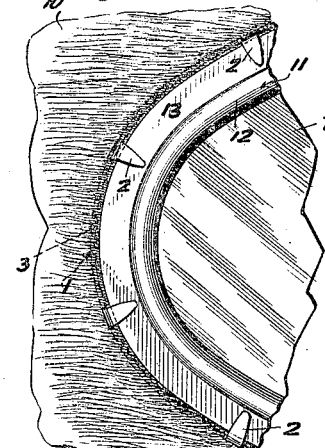
Fig. 4.
Inventor
John B. Schaaf
By Word & Word
Attorneys
Witness
Francis E. Alden

UNITED STATES PATENT OFFICE.

JOHN B. SCHAAF, OF CINCINNATI, OHIO, ASSIGNOR OF ONE-HALF TO CHARLES ARBOGAST, OF CINCINNATI, OHIO.

CURTAIN-WINDOW LIGHT.

1,423,685.

Specification of Letters Patent.   Patented July 25, 1922.

Application filed July 9, 1920. Serial No. 394,991.

*To all whom it may concern:*

Be it known that I, JOHN B. SCHAAF, a citizen of the United States, and residing at Cincinnati, in the county of Hamilton and State of Ohio, have invented a new and useful Improvement in Curtain-Window Lights, of which the following specification is a full disclosure.

My invention relates to window lights, particularly for curtains of vehicle tops or the like, and has for an object the provision of a metallic structure and fastening means for retainably securing a sheet of flexible transparency to the curtain material about the windows or light openings, whereby the transparency is securely mounted in place and is not susceptible to the swaying or folding movements of the curtain, injurious to the transparency. The possibility of breakage of the transparency being thereby reduced to the minimum, and when broken, can be easily and quickly replaced without detaching the main frame of the structure from the curtain.

Another object is to so clamp the transparent material at or near its periphery that the same will be held in taut condition, and to fasten the said material to one of a pair of mating binding frames only, in order that the same may be easily detached therefrom in case of breakage.

Other objects and certain advantages will be set forth in the description and special reference is made to the drawings, forming a part of this specification, in which:

Fig. 1 is an inner face view of the outer frame showing the transparent material fastened thereto.

Fig. 2 is a sectional view showing the invention applied and taken on line 2—2, Fig. 1.

Fig. 3 is a fragmentary elevation taken from the rear of the assembled device.

Fig. 4 is a fragmentary edge view of the outside frame, showing the integral prongs thereon.

In carrying out my invention, I provide an outside frame member 1, of stamped material, preferably of sheet metal, and of semi-tubular cross-section, having tangs or prongs 2, the outer edge 3, at suitable spacing from one another. These tangs or prongs in securing the light over the curtain light opening are engaged through the curtain material and clenched inwardly over a backing frame. Upon the inner periphery 4, of the concave side of the frame 1, prongs 5 are provided (in this instance, four in number), at diametrically opposite points, and normally extending at an angle to the plane of the frame, designed to be inserted through openings 6, of a sheet 7 of transparent material used for a window light, after which the said prongs are bent inwardly upon the frame or parallel with the plane of the frame, as shown, to clamp the said light to the frame 1.

The frame 1, and its attached sheet of transparent material 7, are then placed into position about the opening 9, of the curtain 10, and the prongs or tangs 2 are inserted through the said curtain material.

A backing and clamping frame 11, of stamped sheet metal, providing a semi-tubular cross-sectional portion 12, and a flat portion 13, is placed on the opposite side of the curtain 10, in juxtaposition with the opening 9 and matingly with the frame 1, with its convex side in opposition to the convex side of the frame 1, and its peripheral edge in clamping contact with the transparent material, to force the said material against the peripheral edge 4, of the frame 1. The prongs 2 are then bent or clenched over and against the portion 13, of the frame 11, to clamp said frame and its flat portion 13, and edge 14, respectively against the curtain 10 and transparent material 7, securing the frames together with the transparency sheet and curtain between them.

When it is desired to remove a broken light, the prongs 2 are bent upwardly, sufficient to release the backing frame 11, which is then removed, whereupon the prongs 5 are bent upwardly, for removing the broken light and substituting a new one, without removing the frame 1 from its position about the opening 9.

Having described my invention, I claim:

In a device of the class described, a base frame of substantially semi-tubular cross section, adapted to surround a curtain opening, means integral therewith for removably fastening a window light therewithin against the concave side of said base frame and against its inner periphery, a clamping frame providing a semi-tubular and a flat clamping portion placed in opposition to the said base frame, the concurrent peripheral edges of the two frames acting to clamp the said transparent material, and a means integral with the base frame for attaching the same about the opening and for clamping the two frames together.

In witness whereof, I hereunto subscribe my name, as attested by the two subscribing witnesses.

JOHN B. SCHAAF.

Witnesses:
L. A. BECK,
J. C. JUNIUS.